United States Patent
Twitchell, Jr.

(10) Patent No.: US 8,410,907 B2
(45) Date of Patent: *Apr. 2, 2013

(54) EVENT-DRIVEN MOBILE HAZMAT MONITORING

(75) Inventor: Robert W. Twitchell, Jr., Cumming, GA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/470,272

(22) Filed: May 12, 2012

(65) Prior Publication Data

US 2012/0280808 A1 Nov. 8, 2012

Related U.S. Application Data

(63) Continuation of application No. 12/774,586, filed on May 5, 2010, now abandoned, which is a continuation of application No. 12/495,716, filed on Jun. 30, 2009, now Pat. No. 7,847,676, which is a continuation of application No. 11/425,047, filed on Jun. 19, 2006, now Pat. No. 7,554,442.

(60) Provisional application No. 60/691,574, filed on Jun. 17, 2005.

(51) Int. Cl.
*H04Q 5/22* (2006.01)

(52) U.S. Cl. .................................. 340/10.1; 340/870.16
(58) Field of Classification Search ................. 340/10.1, 340/870.16, 540, 539.26
See application file for complete search history.

(56) References Cited

U.S. PATENT DOCUMENTS

2002/0050932 A1* 5/2002 Rhoades et al. ......... 340/870.16

* cited by examiner

*Primary Examiner* — Shirley Lu
(74) *Attorney, Agent, or Firm* — Tillman Wright, PLLC; Chad D. Tillman; Jeremy C. Doerre (57) ABSTRACT

A HAZMAT monitoring system detects a plurality of different hazardous materials and includes first and second pluralities of RSIs. Each RSI of the first plurality forms a node in a first wireless sensor network and is associated with a mobile container and with at least one sensor that is configured to acquire data for detecting a first hazardous material. Each RSI further is configured to receive the sensor data and wirelessly transmit, over the first wireless sensor network, data relating to the received sensor data pertaining to the detection of the first hazardous material. Each RSI of the second plurality is similarly associated and configured. Communications within a respective wireless sensor network do not result in communications within the another wireless sensor network. A gateway is configured to independently communicate with each respective wireless sensor network.

20 Claims, 5 Drawing Sheets

EVENT-DRIVEN MOBILE HAZMAT MONITORING

CROSS-REFERENCE TO RELATED APPLICATIONS

The present application is a continuation of, and claims priority under 35 U.S.C. §120 to, Twitchell U.S. Nonprovisional patent application Ser. No. 12/774,586, filed May 5, 2010 now abondoned, which '586 Application published as U.S. Patent Application Publication No. 2010/0214059, and which '586 Application a continuation of, and claims priority under 35 U.S.C. §120 to, Twitchell U.S. Nonprovisional patent application Ser. No. 12/495,716, filed Jun. 30, 2009, which '716 Application issued as U.S. Pat. No. 7,847,676, and which '716 Application is a continuation of, and claims priority under 35 U.S.C. §120 to, Twitchell U.S. Nonprovisional patent application Ser. No. 11/425,047, filed Jun. 19, 2006, which '047 Application issued as U.S. Pat. No. 7,554,442 and which '047 Application is a nonprovisional of, and claims priority under 35 U.S.C. §119(e) to, Twitchell U.S. Provisional Patent Application No. 60/691,574 filed Jun. 17, 2005. The entire disclosure of each of these patent applications, publications, and patents is hereby incorporated herein by reference.

INCORPORATION BY REFERENCE

The present application hereby incorporates by reference: U.S. Pat. No. 6,753,775 B2 (titled "Smart Container Monitoring System"); U.S. Pat. No. 6,745,027 B2 (titled "Class Switched Networks for Tracking Articles"); U.S. Pat. No. 6,665,585 B2 (titled "Method and Apparatus for Container Management"); U.S. Pat. No. 5,458,042 (titled "Container for Packaging an Object Provided with a Radio Frequency Transmission Device and Removable Element for Such a Container"); International Patent Application Publication No. WO 03/032501 A2, which international patent application designated the United States and was published in English (titled "Network Formation in Asset-Tracking System Based on Asset Class"); International Patent Application Publication No. WO 03/098851 A1, which international patent application designated the United States and was published in English (titled "LPRF Device Wake Up Using Wireless Tag"); U.S. Patent Application Publication No. 2005/0093703 A1 (titled "Systems and Methods Having LPRF Device Wake Up Using Wireless Tag"); U.S. Patent Application Publication No. 2005/0093702 A1 (titled "Manufacture of LPRF Device Wake Up Using Wireless Tag"); U.S. Patent Application Publication No. 2004/0082296 A1 (titled "Network Formation in Asset-Tracking System Based on Asset Class"); U.S. Patent Application Publication No. 2004/0183673 A1 (titled "Portable Detachable Self-Contained Tracking Unit for Two-Way Satellite Communication with a Central Server"); and U.S. Patent Application Publication No. 2004/0021572 A1 ("Electronic Baggage Tracking and Identification"); U.S. patent application Ser. No. 11/422,321 (titled "Remote Sensor Interface (RSI) Stepped Wake-Up Sequence"), which published as U.S. Patent Application Publication No. 2006/0276161 A1; and U.S. patent application Ser. No. 11/423,127 (titled "All Weather Housing Assembly For Electronic Components"), which published as U.S. Patent Application Publication No. 2006/0289204.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

FIELD OF THE INVENTION

The present invention generally relates to the monitoring of materials and, in particular, hazardous materials. Furthermore, the present invention relates to mobile containers of such materials and sensors associated therewith for monitoring of the mobile containers. The descriptions herein relate to mobile containers and vehicles that are in motion as well as to mobile containers and vehicles that are stationary.

BACKGROUND

A 1997 Hazardous Material Shipment Study commissioned by the U.S. Department of Transportation (USDOT) indicates that approximately 3.1 billion tons of hazardous materials were transported in the United States in 1997, which is roughly 8.5 million tons per day. Specifically, approximately 0.5 billion tons of chemicals and 2.6 billion tons of petroleum products were transported in 1997. Furthermore, between 1996-2005, there were more than 150,000 hazardous material transportation incidents reported to the USDOT. The USDOT defines hazardous materials (HAZMAT) as belonging to one of nine classes of materials, including explosives, gases, flammable solids, flammable liquids, oxidizers and organic peroxides, toxic materials and infectious substances, radioactive materials, corrosive materials and miscellaneous dangerous goods. Each of these classes of materials is dangerous and potentially harmful to people, and therefore, caution should be utilized in their handling and transportation. Accordingly, it is important to be able to accurately and efficiently monitor the transportation of such hazardous materials.

Monitoring may include asset tracking or it may include incident notification in the event of an incident such as a leak or spill of hazardous materials. Monitoring sensors are known that can quickly and accurately detect a hazardous material incident. For example, U.S. Patent Application Publication No. 2005/0046567 discloses a sensor for monitoring the internal environment of a container. However, a monitoring network that efficiently integrates and connects such available sensors is desired.

Unfortunately, a more recent issue with hazardous materials is concern regarding the administration of chemical weapons. Risk of introduction of a terrorist biological, radiological or explosive device via a transportation container is high, and the consequences to people and property surrounding such container could be catastrophic. Further, such a terrorist incident could cripple the international economy because of the importance of transportation containers in world commerce.

SUMMARY OF THE INVENTION

The present invention includes many aspects and features.

A wireless sensor network for monitoring of a container includes a sensor disposed for monitoring of a container, at least one remote sensor interface, and a gateway. The sensor is configured to acquire data related to the container and communicate sensor data as a function of the acquired data. The remote sensor interface is configured to receive the sensor data communicated from the sensor and wirelessly transmit data relating to the received sensor data. The gateway is configured to receive data related to the sensor data, and transmitted from the at least one remote sensor interface, and is configured to communicate data relating to the sensor data to a network external to the wireless sensor network. The gateway is in at least intermittent electronic communications with the external network.

In a feature of the invention, the sensor is a chemical sensor. In accordance with this feature, the chemical sensor may be sensitive to a chemical present within the container.

In a feature of the invention, the sensor comprises a biological sensor, a radiological sensor, a nuclear sensor, an explosive sensor, or a chlorine sensor.

In a feature of the invention, the sensor detects a particular chemical, substance, or biological agent.

In a feature of the invention, the sensor comprises a seal monitor that detects openings and/or closures of a container.

In a feature of the invention, the sensor comprises an inclination monitor for detecting the overturning or tipping of a container.

In a feature of the invention, the sensor comprises a device or array of devices for measuring state conditions of a container.

In a feature of the invention, the sensor comprises a device or array of devices for measuring state conditions of contents of a container. In accordance with this feature, the state condition is at least one of temperature, volume, weight, and pressure.

In a feature of the invention, the sensor comprises an activity monitoring device.

In a feature of the invention, the activity monitoring device comprises at least one of a microphone, a motion detector, a light detector, and a broad-band RF signal scanner.

In a feature of the invention, the sensor comprises a device for detecting at least one of physical presence at a container, movement of a container, or tampering with a container.

In a feature of the invention, the sensor comprises an accelerometer.

In a feature of the invention, the sensor detects data regarding the security, integrity, configuration, condition, disposition, orientation, location, contents, or surroundings of a container.

In a feature of the invention, a first of the at least one remote sensor interfaces receives the sensor data directly from the sensor, and the gateway receives data related to the sensor data directly from a second of the at least one remote sensor interfaces different from the first of the at least one remote sensor interfaces.

In a feature of the invention, the network further includes a railroad car that is monitored by the sensor.

In a feature of the invention, the network further includes a tanker truck that is monitored by the sensor.

In a feature of the invention, the network further includes a maritime shipping container that is monitored by the sensor.

In another aspect of the invention, a method is disclosed for monitoring a container in a wireless network that includes (i) a sensor disposed for monitoring of a container, (ii) at least one remote sensor interface, and (iii) a gateway for receiving data from the at least one remote sensor interface and communicating with a network external to the wireless sensor network. The method includes the steps of (a) acquiring data related to the container; (b) after step (a), communicating sensor data as a function of the acquired data; (c) after step (b), receiving the sensor data; (d) after step (c), wirelessly transmitting data relating to the receiving sensor data; (e) after step (d), receiving data related to the sensor data; and (g) after step (e), communicating data related to the sensor data to a network external to the wireless sensor network.

In a feature of this aspect, at least one common designation network is formed.

Preferably, a plurality of common designation networks are be formed and comprise class-based networks.

In a feature of this aspect, the method further includes supplying power to the at least one remote sensor interface utilizing solar power. Solar power may be supplied by at least one solar panel.

In a feature of this aspect, the method further includes supplying power to the gateway utilizing solar power. Solar power may be supplied by at least one solar panel.

In a feature of this aspect, communicating data related to the sensor data to a network external to the wireless sensor network includes communicating via a satellite radio signal. In addition thereto, or alternatively, communicating data related to the sensor data to a network external to the wireless sensor network includes communicating via a cellular telephony signal.

In addition to the aforementioned aspects and features of the present invention, it should be noted that the present invention further includes the various possible combinations of such aspects and features.

BRIEF DESCRIPTION OF THE DRAWINGS

One or more embodiments of the present invention will be described in detail with reference to the accompanying drawings which are briefly described below, and wherein the same elements are referred to with the same reference numerals.

DETAILED DESCRIPTION

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, preferred embodiments of the present invention are next described. The following description of the preferred embodiment(s) is merely exemplary in nature and is in no way intended to limit the invention, its application, or uses.

Figure 1:
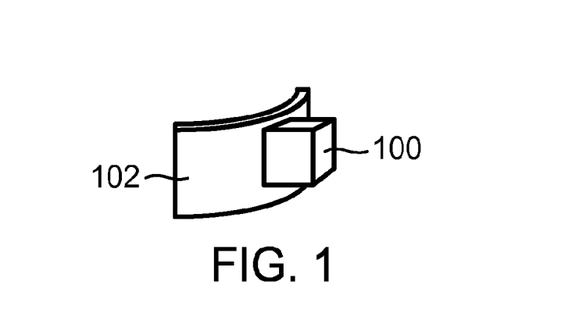
FIG. 1 is an illustration of a remote sensor interface assembly in accordance with a preferred embodiment of the present invention.
Figure 2:
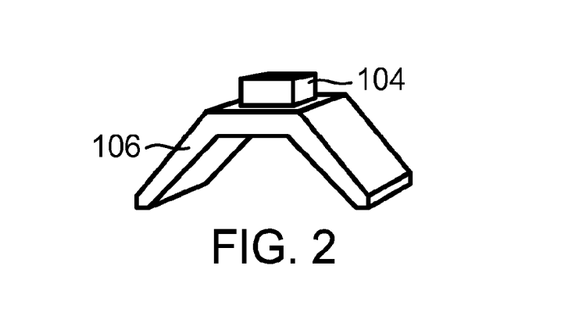
FIG. 2 is an illustration of a gateway assembly in accordance with a preferred embodiment of the present invention.

FIG. 1 is a perspective view of a remote sensor interface (RSI) assembly adapted for utilization in mobile HAZMAT monitoring. FIG. 2 is a perspective view of a gateway assembly adapted for utilization in mobile HAZMAT monitoring. In particular, the RSI assembly of FIG. 1 includes an RSI 100 attached to a collar plate 102 for mounting to a container. The gateway assembly of FIG. 2 includes a gateway 104 attached to a saddle plate 106 for mounting to a container.

Figure 3:
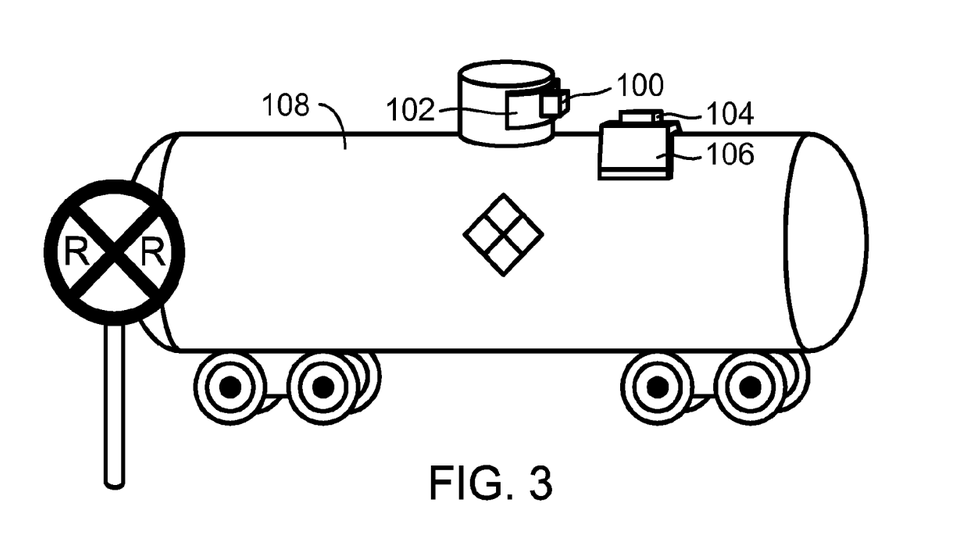
FIG. 3 is an illustration of the remote sensor interface assembly of FIG. 1 and the gateway assembly of FIG. 2 mounted on a mobile container in accordance with an exemplary scenario of HAZMAT monitoring of the present invention.

FIG. 3 is a schematic representation of a HAZMAT monitoring system in accordance with a preferred embodiment of the present invention. In FIG. 3, the RSI assembly and gateway assembly are each mounted to a mobile chemical container 108 for the purpose of monitoring the mobile chemical container 108, and optionally the environment surrounding the container. The mobile container 108 is illustrated as a railroad tanker car merely for exemplary and illustrative purposes, and it should be understood that the descriptions herein relate equally as well to other types of mobile containers.

As described herein, a remote sensor interface deployed in association with a mobile container collects data from one or more sensors and communicates the data (directly or indirectly through other RSIs) to a gateway. The gateway preferably receives the data collected by several RSIs and serves as a bridge between the RSIs and an external network such as a cellular telephony network, a satellite radio network, or the Internet. Thus, an interested party at a centralized location is able to receive data regarding remotely located mobile containers and is thereby informed of an event to which a response may be needed or appropriate. Interested parties may include local emergency response teams, hazardous materials response teams, government transportation authorities, highway authorities, aviation authorities, railroad authorities, military officials, law enforcement officials, and both the suppliers and intended recipients of transported materials. The incorporated materials provide further descriptions of RSIs, gateways, and networks formed thereby. While the invention described herein relates to various implementations of such RSIs, gateways, and networks, the RSIs are deployed with mobile containers in association with sensors for HAZMAT monitoring.

With regard to FIG. 3, the RSI 100 is capable of electronic communications, preferably wireless communications, with the gateway 104. In particular, in monitoring the container 108 and environment thereof, the RSI 100 conveys data regarding one or more sensors (not shown) to the gateway 104. Each such sensor may be an on-board component of the RSI 100 as a part thereof, or may be external to the RSI. Insofar as sensors are external, such sensors are capable of communicating with the RSI either wirelessly or by way of cabled connections.

As used herein with respect to HAZMAT monitoring, the term "sensor" relates broadly to many types of devices that are each in some way sensitive to the security, integrity, configuration, condition, disposition, orientation, location, contents, or surroundings of a container. Thus, a sensor can be a seal monitor that detects openings and closures of a container. A sensor can be an inclination monitor for detecting the overturning or tipping of a container that should be maintained in a particular orientation. A sensor can be a device or array of devices for measuring state conditions of a container or that of its contents such as temperature, volume, weight or mass, and pressure. A sensor can be any activity-monitoring or reconnaissance device such as a camera, a microphone, a motion detector, a light detector, and a broad-band RF signal scanner. A sensor can be a device for detecting physical presence, asset movement, and tampering such as a pressure-sensitive pad on a floor or surface, a switch on an access-panel, and an optical device such as an infra-red beam device, and an on-board accelerometer.

Furthermore, a sensor, nominally a chemical sensor, can be a device that detects a particular chemical or substance, or detects a range of chemicals or substances. A chemical sensor can be a device that is sensitive to any presence of a chemical or substance that generally should not be present in any detectable quantity or concentration, such as a chemical weapon or biohazard. Moreover, a chemical sensor can be a device that generates a response to a raised concentration of a chemical or substance, such as carbon monoxide, that is generally otherwise present in safe, trace, or ambient concentrations.

Figure 4:
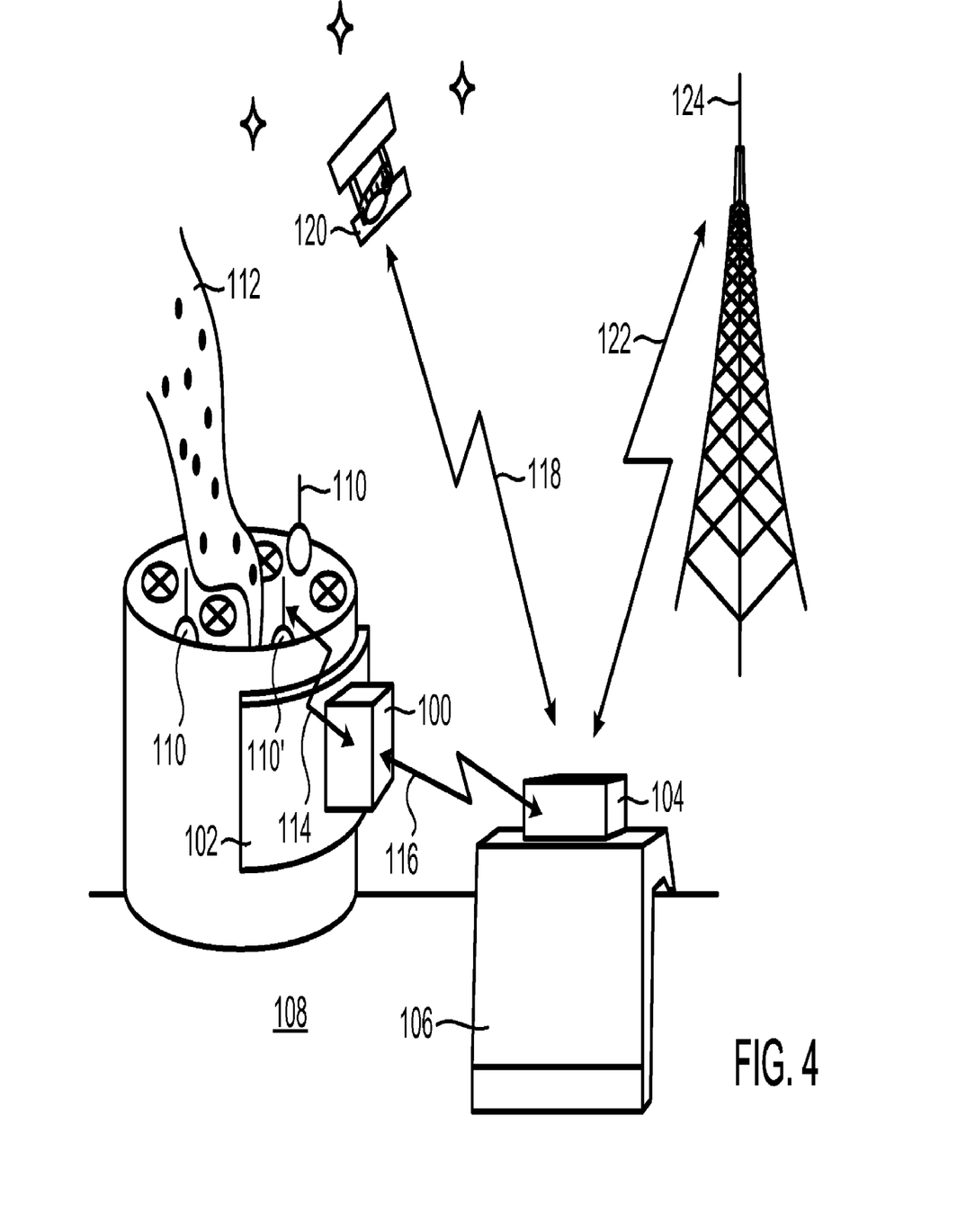
FIG. 4 shows another exemplary scenario of HAZMAT monitoring in accordance with the present invention.

FIG. 4 is a schematic illustration of a HAZMAT monitoring system in accordance with another embodiment of the present invention. In FIG. 4, the RSI 100 and the gateway 104 are each mounted on the mobile container 108 that contains a potentially hazardous chemical. Several sensors 110 are attached to the mobile container 108 proximal a manifold of valves and vents. A HAZMAT related event is occurring in that a particular sensor 110' detects the potentially hazardous chemical in the form of a gas 112 escaping from the container, and the sensor 110' consequently transmits an RF signal 114 to the RSI 100. In response to receipt of the signal 114, the RSI 100 transmits an RF signal 116 to the gateway 104. In response to receipt of the signal 116, the gateway 104 communicates information regarding the escaping gas 112 via satellite communications 118 and/or cellular communications 122. In this respect, the gateway 104 communicates via satellite communications 118 with satellite 120 and/or communicates via cellular communications 122 with tower 124. Cellular communications preferably are used when a cell tower is within range of the gateway, and satellite communications preferably are used when cellular communications are unavailable to the gateway. The information conveyed by communications 118,122 is further carried by respective external networks, of which the satellite 120 and tower 124 are parts, to one or more parties that are interested in the escaping gas 112 and contents of the container 108. Such external networks may comprise, for example, the Internet.

In variations of the exemplary system of FIG. 4, wireless signals transmitted by a gateway are received by an antenna in a proprietary wireless network such as that at a controlled private facility. In another example, according to the present invention, a gateway transmits a satellite radio signal but not a cellular telephony signal, and, in yet another example, a gateway transmits a cellular telephony signal but not a satellite radio signal.

Figure 5:
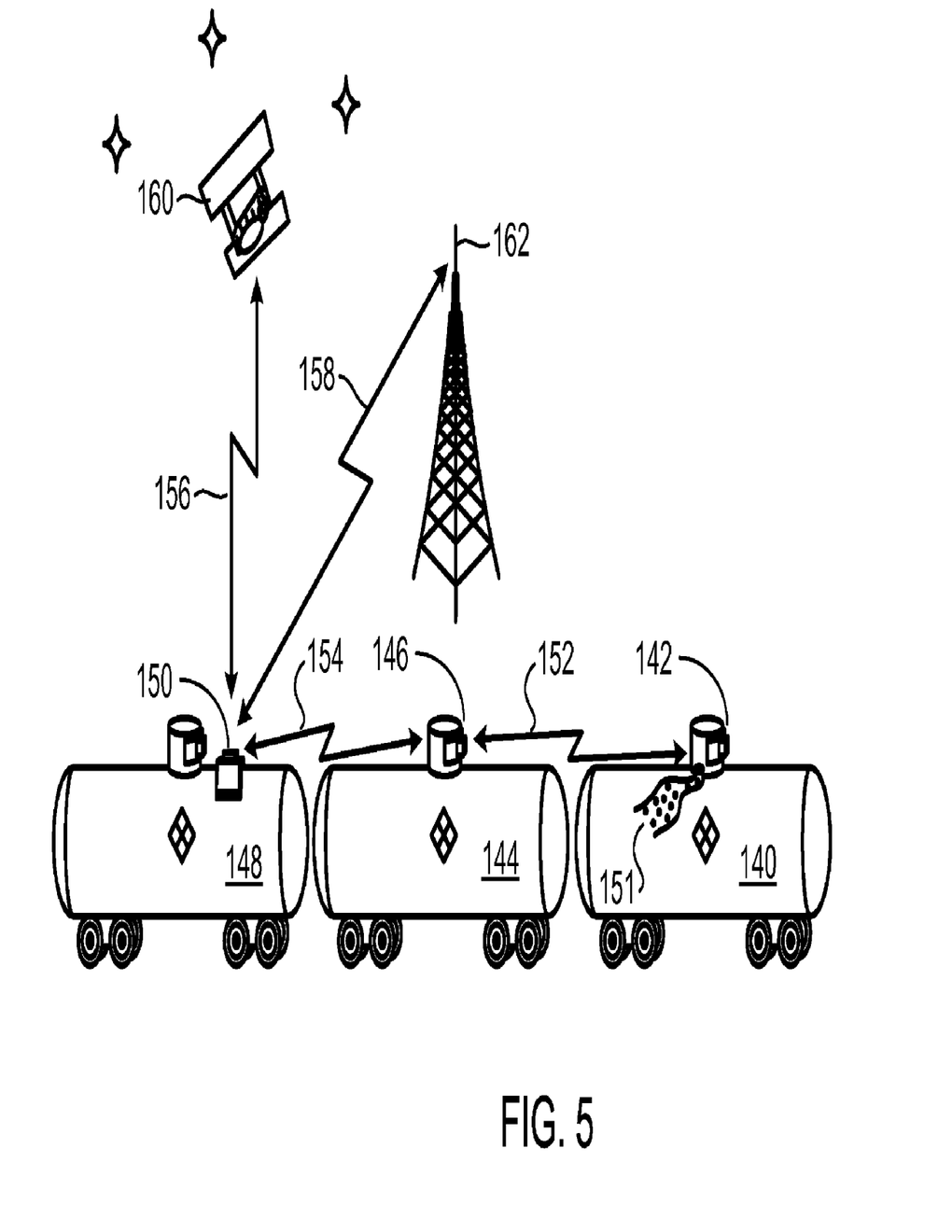
FIG. 5 shows another exemplary scenario of HAZMAT monitoring in accordance with the present invention.

FIG. 5 is a schematic illustration of a HAZMAT monitoring system in accordance with still yet another embodiment of the present invention. FIG. 5 illustrates that a gateway is preferably deployed with a number of RSIs, and that a network is formed among the RSIs and gateway. Within such a network, which may be a common designation network and/or an ad hoc network, wireless signals can be relayed from RSI to RSI (i.e., the network includes "hopping" of communications from RSI to RSI), and a gateway can receive data from a particular RSI by way of one or more other RSIs that relay the data, wherein the particular RSI otherwise is out of range of the gateway.

A train of railroad cars proceeding along a track includes a first mobile container 140 having mounted thereon a first RSI 142, a second mobile container 144 having mounted thereon a second RSI 146, and a third mobile container 148 having mounted thereon a gateway 150. A HAZMAT related event is occurring in that a substance 151 leaking from the first mobile container 140 is detected by one or more chemical sensors proximal or on-board the first RSI 142. The first RSI 142 transmits a wireless signal 152 that conveys data related to the detection of the leaking substance 151. Responsively to its receipt of the wireless signal 152, the second RSI 146 transmits a wireless signal 154 that, among other things, relays the data related to the detection of the leaking substance to the gateway 150. In response to its receipt of the signal 154, the gateway 150 communicates information regarding the detection of the leaking substance via the satellite communications 156 and/or the cellular communications 158 for further propagation of the information regarding the detection of the leak by way of networks associated respectively with the Earth orbiting satellite 160 and/or cell tower 162.

Figure 6:
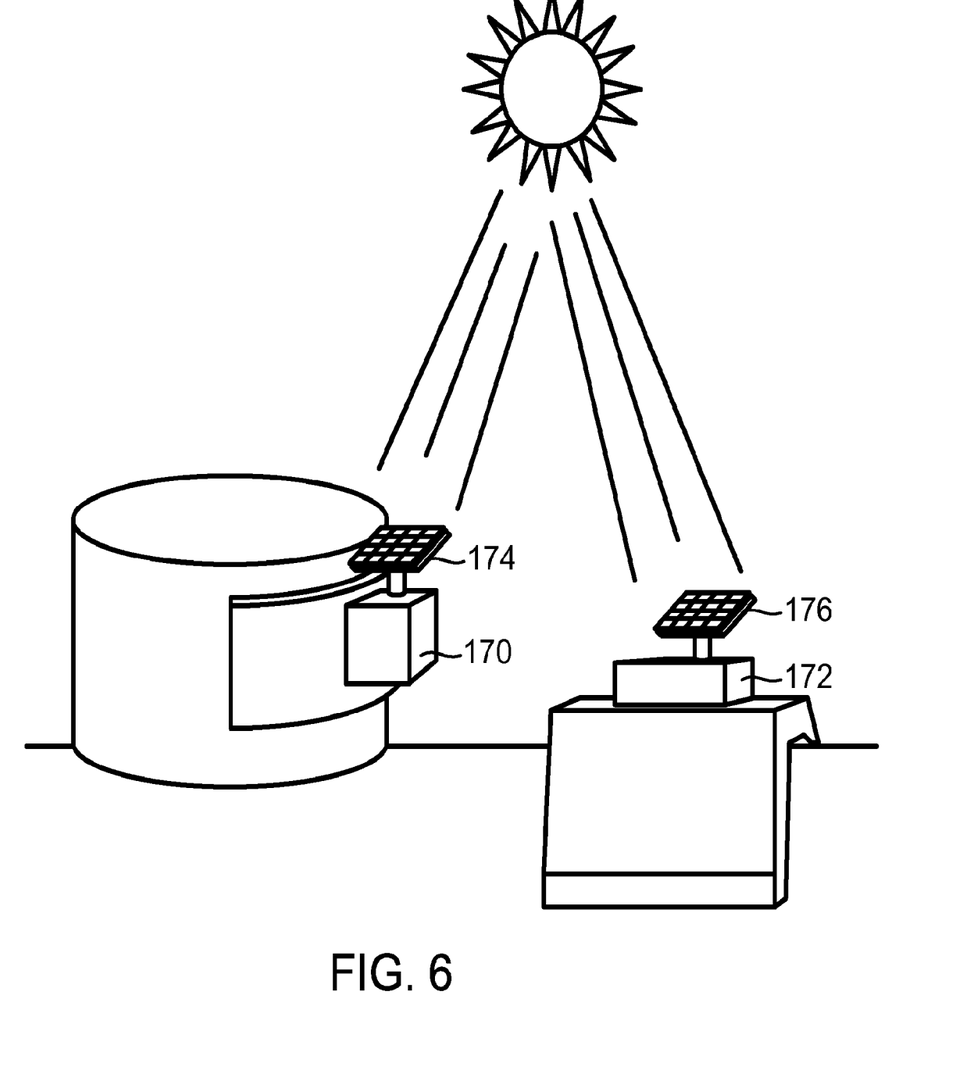
FIG. 6 is an illustration of a remote sensor interface assembly and a gateway assembly, each having a respective solar power collector, in accordance with another preferred embodiment present invention.

FIG. 6 is a schematic illustration of a HAZMAT monitoring system in accordance with a preferred embodiment of the present invention wherein solar power collectors are utilized to provide power. An RSI 170 and gateway 172 have attached thereto respective solar power collectors 174, 176. The solar power collectors serve to re-charge, supplement, or obviate electrical batteries that might otherwise be drained causing RSIs and gateways to lose function. The solar power collectors thereby serve to reduce costs related to replacing spent batteries as well as serving to extend the potential range of RSI and gateway networks into areas where battery servicing is infeasible according to costs, according to needs for secrecy, or according to the presence of hazards posed by materials, conditions, or even hostile forces. Sensors associated with RSIs may also be powered in part or solely by solar power collectors. In yet other variations, one or more sensors may be powered by solar power collectors while the RSIs and/or gateways are powered by internal power sources such as batteries. Moreover, when internal power sources are utilized, the RSIs and/or gateways preferably reside in "standby" or "sleep mode" until awoken in accordance with one or more of the incorporated references.

Figure 7:
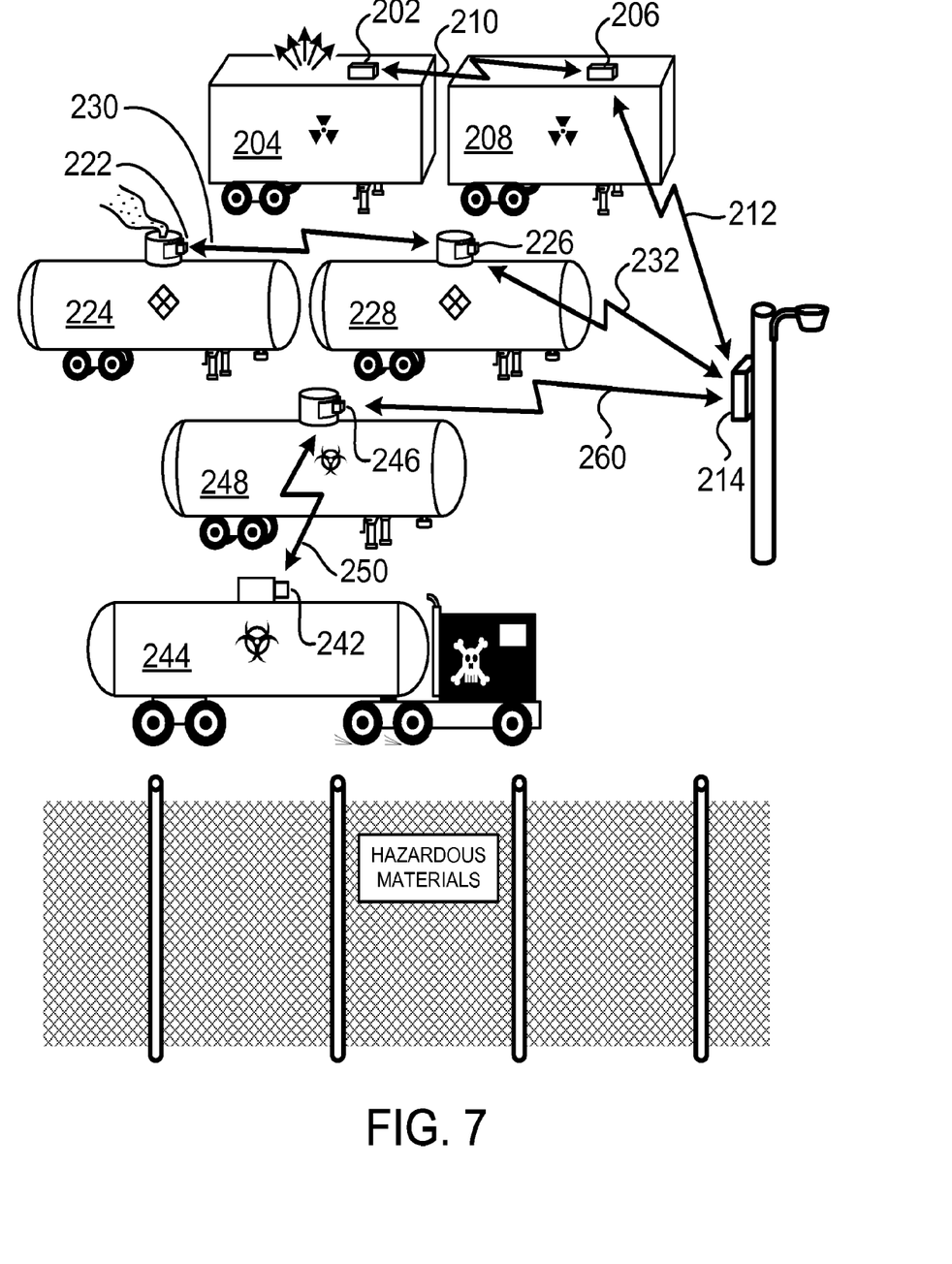
FIG. 7 shows yet another exemplary scenario of HAZMAT monitoring in accordance with the present invention.

FIG. 7 is a schematic illustration of a HAZMAT monitoring system in accordance with another embodiment of the present invention. Several common designation networks, which may include a class-based network, are formed among common designations of mobile containers. An RSI 202 mounted on mobile container 204, which RSI 202 is out of range of the gateway 214, has formed a first "radioactive" common designation network with an RSI 206 mounted on mobile container 208. A HAZMAT related event has occurred within the network in that a radiation sensor on-board or proximal the RSI 202 has detected a raised radiation level at the surface of the mobile container 204. Such an event may indicate, for example, that radioactive material is leaking, that tampering is occurring, or that undesired shifting of materials or shielding has occurred within the mobile container 204. A wireless signal 210 is transmitted by the RSI 202 and is received by the RSI 206. The wireless signal 210 conveys data related to the event from the RSI 202 to the RSI 206. Responsively to its receipt of the signal 210, the RSI 206 transmits a wireless signal 212 to a stationary gateway 214, thereby relaying data related to the event to the gateway 214 for further communications (not shown).

Furthermore, as shown in FIG. 7, an RSI 222 mounted on the mobile container 224, which RSI 222 is out of range of the gateway 214, has formed a second "chemical" common designation network with an RSI 226 mounted on the mobile container 228. A HAZMAT related event has occurred within the network in that a chemical sensor on-board or proximal the RSI 222 has detected a raised concentration of a gaseous substance at the valve manifold area of the mobile container 224. Such an event may indicate, for example, that a valve or the container 224 is leaking or that tampering is occurring. A wireless signal 230 is transmitted by the RSI 222 and is received by the RSI 226. The wireless signal 230 conveys data related to the event from the RSI 222 to the RSI 226. Responsively to its receipt of the signal 230, the RSI 226 transmits a wireless signal 232 to the stationary gateway 214, thereby relaying data related to the event to the gateway 214 for further communications (not shown).

Still yet, as shown in FIG. 7, an RSI 242 mounted on the mobile container 244, which RSI 242 is out of range of the gateway 214, has formed a third "bio-chemical" common designation network with an RSI 246 mounted on the mobile container 248. A HAZMAT related event has occurred within the network in that a motion sensor, an accelerometer, or a proximity sensor associated with the RSI 242 has detected unauthorized movement of the mobile container 244 that contains a material that represents a potential bio-chemical hazard. Such an event may indicate, for example, that theft is occurring or that the mobile container 244 is being moved in error. A wireless signal 250 is transmitted by the RSI 242 and is received by the RSI 246. The wireless signal 250 conveys data related to the event from RSI 242 to RSI 246. Responsively to its receipt of the signal 250, the RSI 246 transmits a wireless signal 260 to the stationary gateway 214, thereby relaying data related to the event to the gateway 214 for further communications (not shown).

As will be appreciated from the foregoing description related to FIG. 7, communications within the radioactive network do not result in communications within any of the chemical and bio-chemical networks, and vice-versa. This results from the preferred use of common designation ad hoc networks within the HAZMAT monitoring system. Communications between RSIs and gateways further may be deterministic or nondeterministic.

Several HAZMAT monitoring systems described herein with reference to the figures relate to chemical sensors for monitoring transported or stored chemicals and substances. Such monitoring relates to work-place safety, public health, and the protection of the environment in that many chemicals and substances are indeed hazardous if released or mishandled. Furthermore, such monitoring also relates to anti-terrorism activities, as such chemicals and substances can be used in terrorist attacks. It is therefore to be understood that, though particular substances are named for exemplary purposes, the scenarios discussed herein relate particularly to any hazardous material, such as those that represent chemical, biological, radiological, nuclear, and explosive threats. Moreover, insofar as such materials represent commercially valuable assets, it should be understood that such monitoring also broadly relates to asset monitoring and asset protection in general without regard for whether such assets are hazardous, in that many chemicals and substances can be extremely valuable in various industries.

Particular chemicals and sensors thereof to which descriptions herein relate include, but are not limited to, carbon monoxide, hydrogen sulfide, nitrogen dioxide, nitric oxide, chlorine, oxygen, sulfur dioxide, hydrogen, and other materials useful in various industries or produced as by-products thereof. Other examples include combustible materials such as methane, butane, propane, n-pentane, acetylene, hexamethyldisilazane (HMDS), petroleum, and petroleum distillates.

It will further be appreciated that each of the aforementioned exemplary scenarios involves detection of a leaking substance, escaping gas, or other "event" relating to a container that is monitored, and that the resulting communications are typically for purposes of alerting the appropriate person or entity for an appropriate response.

It also will be appreciated that each of the aforementioned exemplary scenarios involves outdoor HAZMAT monitoring but that the HAZMAT monitoring in accordance with the present invention likewise may be utilized indoors or both indoors and outdoors.

Event-driven monitoring as further contemplated herein, however, may include proactive monitoring in addition to such reactive monitoring. For example, if a sensor comprises a camera, proactive monitoring may include reviewing still pictures or video clips periodically captured by the camera to insure nothing out of the ordinary is occurring with regard to the container. A sensor further may include a GPS receiver, whereby the location of the container can be remotely tracked at periodic intervals to insure that the location of the container is within expected limits. Such proactive monitoring may include acquiring data via one or more sensors at predetermined intervals using a timer disposed either at the sensor or at an RSI associated with the sensor. Alternatively, such proactive monitoring may include acquiring data via one or more sensors in response to queries or commands that are issued from the external network via a gateway to one or more RSIs and associated sensor(s). Such queries or commands could be sent at predetermined intervals, in response to predetermined trigger events, or on demand of a user. Moreover, communications from a gateway to another gateway (such as a mobile gateway) and/or an RSI from which sensor-acquired information is desired preferably may be effected using common designation networking in order to reduce RF interference and unnecessary power consumption by other communication devices in the area.

Finally, in order to reduce power consumption and prolong battery life, wake-up technology preferably is utilized in the RSIs and gateways (especially mobile gateways) in the HAZMAT monitoring systems in accordance with the present invention. Such wake-up technology is disclosed, for example, in U.S. Patent Application Publication No. 2005/0093703 A1 (titled "Systems and Methods Having LPRF Device Wake Up Using Wireless Tag") and U.S. patent application Ser. No. 11/422,321 (titled "Remote Sensor Interface (RSI) Stepped Wake-Up Sequence"), which published as U.S. Patent Application Publication No. 2006/0276161 A1, both disclosures of which have been incorporated herein by reference. Such wake-up technology preferably is used not only in RSIs but also in gateways and, in particular, in mobile gateways. Such use of the wake-up technology not only provides reduced power consumption and prolongs internal power sources of these communications devices, but further provides a stealth advantage/security feature in which these communication devices may only respond (and thus reveal their presence) upon receipt of an appropriate wake-up signal.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A system of ad hoc wireless sensor networks for monitoring for a plurality of different hazardous materials, the system comprising:
   (a) a first plurality of mobile remote sensor interfaces, each remote sensor interface of the first plurality of mobile remote sensor interfaces forming a node in a first ad hoc wireless sensor network and being
      (i) associated with at least one sensor that is configured to acquire data for detecting the first hazardous material and to communicate sensor data pertaining to the detection of the first hazardous material,
      (ii) configured to receive the sensor data pertaining to the detection of the first hazardous material that is communicated from said respective at least one associated sensor, and
      (iii) configured to wirelessly transmit, over the first ad hoc wireless sensor network, data relating to said received sensor data pertaining to the detection of the first hazardous material;
   (b) at least a second plurality of mobile remote sensor interfaces,
      (i) each remote sensor interface of the second plurality of mobile remote sensor interfaces forming a node in a second ad hoc wireless sensor network,
         (A) wherein communications within the first ad hoc wireless sensor network do not result in communications within the second ad hoc wireless sensor network, and
         (B) wherein communications within the second ad hoc wireless sensor network do not result in communications within the first ad hoc wireless sensor network, and
      (ii) each remote sensor interface of the second plurality of mobile remote sensor interfaces being,
         (A) associated with at least one sensor that is configured to acquire data for detecting the second hazardous material and to communicate sensor data pertaining to the detection of the second hazardous material,
         (B) configured to receive the sensor data pertaining to the detection of the second hazardous material that is communicated from said respective at least one associated sensor, and
         (C) configured to wirelessly transmit, over the second ad hoc wireless sensor network, data relating to said received sensor data pertaining to the detection of the second hazardous material; and
   (c) a gateway configured to,
      (i) communicate with the first ad hoc wireless sensor network and receive data wirelessly transmitted over the first ad hoc wireless sensor network relating to received sensor data pertaining to the detection of the first hazardous material, and further configured to communicate data relating to the detection of the first hazardous material to a network external to each of the first ad hoc wireless sensor network and the second ad hoc wireless sensor network, said gateway being at least in intermittent electronic communications with the external network, and
      (ii) communicate with the second ad hoc wireless sensor network and receive data wirelessly transmitted over the second ad hoc wireless sensor network relating to received sensor data pertaining to the detection of the second hazardous material, and further configured to communicate data relating to the detection of the second hazardous material to the external network.

2. The system of claim 1, wherein at least one of the remote sensor interfaces of the first ad hoc wireless sensor network is associated with a railroad car.

3. The system of claim 1, wherein at least one of the remote sensor interfaces of the first ad hoc wireless sensor network is associated with a tanker truck.

4. The system of claim 1, wherein at least one of the remote sensor interfaces of the first ad hoc wireless sensor network is associated with a maritime shipping container.

5. The system of claim 1, wherein the gateway is configured to communicate with the external network by way of satellite communications.

6. The system of claim 1, wherein the gateway is configured to communicate with the external network by way of cellular communications.

7. The system of claim 1, wherein each remote sensor interface of the first ad hoc wireless sensor network is configured to hop communications from the other remote sensor interfaces of the first ad hoc wireless sensor network, whereby a remote sensor interface of the first ad hoc wireless sensor network is arranged to indirectly communicate with the gateway when out of range of direct communications with the gateway; and wherein each remote sensor interface of the second ad hoc wireless sensor network is configured to hop communications from the other remote sensor interfaces of the second ad hoc wireless sensor network, whereby a remote sensor interface of the second ad hoc wireless sensor network is arranged to indirectly communicate with the gateway when out of range of direct communications with the gateway.

8. The system of claim 1, wherein the gateway and the remote sensor interfaces of the first and second ad hoc wireless sensor networks are located on cars of a train.

9. The system of claim 1, wherein the gateway and the remote sensor interfaces of the first and second ad hoc wireless sensor networks are located on maritime shipping containers.

10. The system of claim 1, wherein a remote sensor interface of the first ad hoc wireless sensor network and a remote sensor interface of the second ad hoc wireless sensor network are attached to a mobile container.

11. The system of claim 1, wherein the gateway is mobile.

12. The system of claim 1, wherein the gateway is stationary.

13. A HAZMAT monitoring system for detecting a plurality of different hazardous materials each representing a chemical, biological, radiological, nuclear, or explosive threat, the HAZMAT monitoring system comprising:
   (a) a first plurality of mobile remote sensor interfaces, each remote sensor interface of the first plurality of mobile remote sensor interfaces forming a node in a first ad hoc wireless sensor network and being,
      (i) associated with at least one sensor that is configured to acquire data for detecting the first hazardous material and to communicate sensor data pertaining to the detection of the first hazardous material,
      (ii) configured to receive the sensor data pertaining to the detection of the first hazardous material that is communicated from said respective at least one associated sensor, and
      (iii) configured to wirelessly transmit, over the first ad hoc wireless sensor network, data relating to said received sensor data pertaining to the detection of the first hazardous material;
   (b) a second plurality of mobile remote sensor interfaces,
      (i) each remote sensor interface of the second plurality of mobile remote sensor interfaces forming a node in a second ad hoc wireless sensor network, (A) wherein communications within the first ad hoc wireless sensor network do not result in communications within the second ad hoc wireless sensor network, and (B) wherein communications within the second ad hoc wireless sensor network do not result in communications within the first ad hoc wireless sensor network, and (ii) each remote sensor interface of the second plurality of mobile remote sensor interfaces being, (A) associated with at least one sensor that is configured to acquire data for detecting the second hazardous material and to communicate sensor data pertaining to the detection of the second hazardous material, (B) configured to receive the sensor data pertaining to the detection of the second hazardous material that is communicated from said respective at least one associated sensor, and (C) configured to wirelessly transmit, over the second ad hoc wireless sensor network, data relating to said received sensor data pertaining to the detection of the second hazardous material; and (c) a gateway configured to, (i) communicate with the first ad hoc wireless sensor network and receive data wirelessly transmitted from the first ad hoc wireless sensor network relating to received sensor data pertaining to the detection of the first hazardous material, and further configured to communicate data relating to the detection of the first hazardous material to a network external to each of the first ad hoc wireless sensor network and the second ad hoc wireless sensor network, said gateway being at least in intermittent electronic communications with the external network, and (ii) communicate with the second ad hoc wireless sensor network and receive data wirelessly transmitted from the second ad hoc wireless sensor network relating to received sensor data pertaining to the detection of the second hazardous material, and further configured to communicate data relating to the detection of the second hazardous material to the external network.

14. The system of claim 13, wherein the gateway is configured to communicate with the external network by way of satellite communications.

15. The system of claim 13, wherein the gateway is configured to communicate with the external network by way of cellular communications.

16. The system of claim 13, wherein each remote sensor interface of the first ad hoc wireless sensor network is configured to hop communications from the other remote sensor interfaces of the first ad hoc wireless sensor network, whereby a remote sensor interface of the first ad hoc wireless sensor network is arranged to indirectly communicate with the gateway when out of range of direct communications with the gateway; and wherein each remote sensor interface of the second ad hoc wireless sensor network is configured to hop communications from the other remote sensor interfaces of the second ad hoc wireless sensor network, whereby a remote sensor interface of the second ad hoc wireless sensor network is arranged to indirectly communicate with the gateway when out of range of direct communications with the gateway.

17. The system of claim 13, wherein the gateway and the remote sensor interfaces of the first and second ad hoc wireless sensor networks are located on cars of a train.

18. The system of claim 13, wherein the gateway and the remote sensor interfaces of the first and second ad hoc wireless sensor networks are located on maritime shipping containers.

19. The system of claim 13, wherein the gateway is mobile.

20. A method for monitoring for a plurality of different hazardous materials using a system of ad hoc wireless sensor networks, the system comprising, a first plurality of mobile remote sensor interfaces, each remote sensor interface of the first plurality of mobile remote sensor interfaces forming a node in a first ad hoc wireless sensor network and being, associated with at least one sensor that is configured to acquire data for detecting the first hazardous material and to communicate sensor data pertaining to the detection of the first hazardous material, configured to receive the sensor data pertaining to the detection of the first hazardous material that is communicated from said respective at least one associated sensor, and configured to wirelessly transmit, over the first ad hoc wireless sensor network, data relating to said received sensor data pertaining to the detection of the first hazardous material;

a second plurality of mobile remote sensor interfaces, each remote sensor interface of the second plurality of mobile remote sensor interfaces forming a node in a second ad hoc wireless sensor network, wherein communications within the first ad hoc wireless sensor network do not result in communications within the second ad hoc wireless sensor network, and wherein communications within the second ad hoc wireless sensor network do not result in communications within the first ad hoc wireless sensor network, and each remote sensor interface of the second plurality of mobile remote sensor interfaces being, associated with at least one sensor that is configured to acquire data for detecting the second hazardous material and to communicate sensor data pertaining to the detection of the second hazardous material, configured to receive the sensor data pertaining to the detection of the second hazardous material that is communicated from said respective at least one associated sensor, and configured to wirelessly transmit, over the second ad hoc wireless sensor network, data relating to said received sensor data pertaining to the detection of the second hazardous material; and a gateway configured to, communicate with the first ad hoc wireless sensor network and receive data wirelessly transmitted over the first ad hoc wireless sensor network relating to received sensor data pertaining to the detection of the first hazardous material, and further configured to communicate data relating to the detection of the first hazardous material to a network external to each of the first ad hoc wireless sensor network and the second ad hoc wireless sensor network, aid gateway being at least in intermittent electronic communications with the external network, and communicate with the second ad hoc wireless sensor network and receive data wirelessly transmitted over the second ad hoc wireless sensor network relating to received sensor data pertaining to the detection of the second hazardous material, and further configured to communicate data relating to the detection of the second hazardous material to the external network, the method comprising the steps of, following detection of the first hazardous material, wirelessly transmitting to the gateway, from a remote sensor interface of the first ad hoc wireless sensor network, over the first ad hoc wireless sensor network, data relating to received sensor data pertaining to the detection of the first hazardous material, and further communicating by the gateway data relating to the detection of the first hazardous material to the external network, and following detection of the second hazardous material, wirelessly transmitting to the gateway, from a remote sensor interface of the second ad hoc wireless sensor network, over the second ad hoc wireless sensor network, data relating to received sensor data pertaining to the detection of the second hazardous material, and further communicating by the gateway data relating to the detection of the second hazardous material to the external network.

\* \* \* \* \*